(12) United States Patent
Potucek et al.

(10) Patent No.: US 6,498,867 B1
(45) Date of Patent: Dec. 24, 2002

(54) METHOD AND APPARATUS FOR DIFFERENTIAL ILLUMINATION IMAGE-CAPTURING AND DEFECT HANDLING

(75) Inventors: Martin Potucek, Austin, TX (US); Albert D. Edgar, Austin, TX (US); Thomas A. Dundon, Manchaca, TX (US)

(73) Assignee: Applied Science Fiction Inc., Austin, TX (US)

( * ) Notice: Subject to any disclaimer, the term of this patent is extended or adjusted under 35 U.S.C. 154(b) by 0 days.

(21) Appl. No.: 09/686,719

(22) Filed: Oct. 10, 2000

Related U.S. Application Data

(60) Provisional application No. 60/158,672, filed on Oct. 8, 1999, and provisional application No. 60/158,710, filed on Oct. 8, 1999.

(51) Int. Cl.[7] .............................. G06T 5/00; G06T 5/50; G01N 21/88; G01N 21/94; G01N 21/958
(52) U.S. Cl. .................. 382/274; 382/275; 382/112; 356/239.1; 356/239.7; 356/237.2
(58) Field of Search .................. 382/274, 275, 382/112, 108, 145, 149, 219, 221, 141; 356/431, 430, 398, 237.1, 239.1, 239.7, 239.8, 237.2, 237.3, 237.4, 237.5; 350/463

(56) References Cited

U.S. PATENT DOCUMENTS

| | | | |
|---|---|---|---|
| 4,260,899 A | 4/1981 | Baker | 250/563 |
| 4,265,545 A * | 5/1981 | Slaker | 356/431 |
| 4,301,469 A | 11/1981 | Modeen et al. | 358/75 |
| 4,302,108 A | 11/1981 | Timson | 356/359 |
| 4,462,860 A | 7/1984 | Szmanda | 156/626 |
| 4,670,779 A | 6/1987 | Nagano | 358/75 |
| 4,677,465 A | 6/1987 | Alkofer | 358/80 |

(List continued on next page.)

FOREIGN PATENT DOCUMENTS

| | | | |
|---|---|---|---|
| DE | 28 21 868 A1 | 11/1979 | G01N/21/32 |
| DE | 196 36 867 C1 | 1/1998 | H04N/5/21 |
| EP | 1 547 811 | 6/1979 | H04N/3/36 |
| EP | 0 422 220 A1 | 4/1991 | A61B/6/03 |
| EP | 0 482 790 B1 | 4/1992 | H04N/1/40 |
| EP | 0 527 097 A2 | 2/1993 | H04N/1/40 |
| EP | 0 569 142 A1 | 11/1993 | H04N/5/253 |

(List continued on next page.)

OTHER PUBLICATIONS

*New Adaptive Vector Filter Based on Noise Estimate*, Mei Yu, et al., IEICE Trans Fundamentals, vol. E82 A, No. 6, Jun., 1999, pp. 911–919.

*A Robust Method for Parameter Estimation of Signal–Dependent Noise Models in Digital Images*, B. Aiazzi, et al., IEEE, 1997, pp. DSP 97—601–604.

*A Regularized Iterative Image Restoration Algorithm*, Aggelos K. Katsaggelos, et al., IEEE, 1991, pp. 914–929.

*Adaptive Fourier Threshold Filtering: A Method to Reduce Noise and Incoherent Artifacts in High Resolution Cardiac Images*, M. Doyle, et al., 8306 Magnetic Resonance in Medicine, May 31, 1994, No. 5, Baltimore, MD., pp. 546–550.

*Anisotropic Spectral Magnitude Estimation Filters for Noise Reduction and Image Enhancement*, Til Aach, et al., IEEE, 1996, pp. 335–338.

(List continued on next page.)

*Primary Examiner*—Scott Rogers
(74) *Attorney, Agent, or Firm*—Dinsmore & Shohl LLP

(57) ABSTRACT

An image processing system is disclosed. The system includes a first light source operable to illuminate an image plane in a first direction and a second light source operable to illuminate the image plane from a second direction. Also included is a sensing device operable to detect light from the first and second light source that interacted with the image plane. A processor operable to receive information from the sensing device and determine an image and image defects is coupled to the sensing device.

59 Claims, 11 Drawing Sheets

U.S. PATENT DOCUMENTS

| | | | |
|---|---|---|---|
| 4,680,638 A | 7/1987 | Childs | 358/214 |
| 4,700,229 A | 10/1987 | Herrmann et al. | 358/166 |
| 4,741,621 A * | 5/1988 | Taft et al. | 356/237.2 |
| 4,775,238 A | 10/1988 | Weber | 356/431 |
| 4,796,061 A | 1/1989 | Ikeda et al. | 355/73 |
| 4,814,630 A | 3/1989 | Lim | 250/578 |
| 4,821,114 A | 4/1989 | Gebhardt | |
| 4,845,551 A | 7/1989 | Matsumoto | 358/80 |
| 4,933,566 A | 6/1990 | Masaaki et al. | 250/563 |
| 4,937,720 A | 6/1990 | Kirchberg | 363/41 |
| 4,969,045 A | 11/1990 | Haruki et al. | 358/228 |
| 4,972,091 A | 11/1990 | Cielo et al. | 250/562 |
| 4,989,973 A | 2/1991 | Noso et al. | 356/239 |
| 4,994,918 A | 2/1991 | Lingemann | 358/214 |
| 5,003,379 A | 3/1991 | Moore, Jr. et al. | 358/54 |
| 5,010,401 A | 4/1991 | Murakami et al. | 358/136 |
| 5,047,968 A | 9/1991 | Carrington et al. | 364/574 |
| 5,058,982 A | 10/1991 | Katzir | 385/33 |
| 5,091,972 A | 2/1992 | Kwon et al. | 382/54 |
| 5,097,521 A | 3/1992 | Massmann | 382/54 |
| 5,149,960 A | 9/1992 | Dunne et al. | 250/226 |
| 5,155,596 A | 10/1992 | Kurtz et al. | 358/214 |
| 5,200,817 A | 4/1993 | Birnbaum | 358/80 |
| 5,266,805 A | 11/1993 | Edgar | 250/330 |
| 5,267,030 A | 11/1993 | Giorgianni et al. | 358/527 |
| 5,291,286 A | 3/1994 | Murakami et al. | 348/469 |
| 5,311,310 A | 5/1994 | Jozawa et al. | 348/416 |
| 5,335,086 A | 8/1994 | Kitamura | 358/431 |
| 5,371,542 A | 12/1994 | Pauli et al. | 348/262 |
| 5,447,811 A | 9/1995 | Buhr et al. | 430/20 |
| 5,448,380 A | 9/1995 | Park | 358/520 |
| 5,452,018 A | 9/1995 | Capitant et al. | 348/651 |
| 5,465,153 A | 11/1995 | Yoshihara et al. | 358/444 |
| 5,465,155 A | 11/1995 | Edgar | 358/500 |
| 5,477,345 A | 12/1995 | Tse | 358/500 |
| 5,509,086 A | 4/1996 | Edgar et al. | 382/167 |
| 5,516,608 A | 5/1996 | Hobbs et al. | 430/30 |
| 5,552,904 A | 9/1996 | Ryoo et al. | 358/518 |
| 5,561,611 A | 10/1996 | Avinash | 364/553 |
| 5,565,931 A | 10/1996 | Girod | 348/675 |
| 5,568,270 A | 10/1996 | Endo | 358/298 |
| 5,581,376 A | 12/1996 | Harrington | 358/518 |
| 5,582,961 A | 12/1996 | Giorgianni et al. | 430/508 |
| 5,583,950 A | 12/1996 | Prokoski | 382/212 |
| 5,589,887 A | 12/1996 | Wischermann | 348/616 |
| 5,608,547 A | 3/1997 | Nakatani et al. | 358/505 |
| 5,641,596 A | 6/1997 | Gray et al. | 430/21 |
| 5,666,443 A | 9/1997 | Kumashiro | 382/266 |
| 5,673,336 A | 9/1997 | Edgar et al. | 382/167 |
| 5,721,624 A | 2/1998 | Kumashiro et al. | 358/450 |
| 5,726,773 A | 3/1998 | Mehlo et al. | 358/474 |
| 5,729,631 A | 3/1998 | Wober et al. | 382/232 |
| 5,771,107 A | 6/1998 | Fujimoto et al. | 358/464 |
| 5,808,674 A | 9/1998 | Adams, Jr. et al. | 348/273 |
| 5,892,595 A | 4/1999 | Yamakawa et al. | 358/530 |
| 5,923,042 A | 7/1999 | Mietta et al. | 250/559.06 |
| 5,930,388 A | 7/1999 | Murakami et al. | 382/167 |
| 5,963,662 A | 10/1999 | Vachtsevanos et al. | 382/150 |
| 5,969,372 A | 10/1999 | Stavely et al. | 250/559.42 |
| 5,979,011 A | 11/1999 | Miyawaki et al. | 15/308 |
| 5,982,941 A | 11/1999 | Loveridge et al. | 382/260 |
| 5,982,951 A | 11/1999 | Katayama et al. | 382/284 |
| 5,991,444 A | 11/1999 | Burt et al. | 382/232 |
| 6,005,987 A | 12/1999 | Nakamura et al. | 382/294 |
| 6,057,040 A | 5/2000 | Hage | 428/447 |
| 6,075,905 A | 6/2000 | Herman et al. | 382/284 |
| 6,078,051 A | 6/2000 | Banton et al. | 250/341.1 |
| 6,078,701 A | 6/2000 | Hsu et al. | 382/294 |
| 6,101,273 A | 8/2000 | Matama | 382/169 |
| 6,128,416 A | 10/2000 | Oura | 382/284 |
| 6,239,886 B1 | 5/2001 | Klassen et al. | 358/518 |

FOREIGN PATENT DOCUMENTS

| | | | |
|---|---|---|---|
| EP | 0 624 848 A2 | 11/1994 | G06F/15/68 |
| EP | 0 669 753 A2 | 8/1995 | H04N/1/407 |
| EP | 0 716 538 A2 | 6/1996 | H04N/1/50 |
| EP | 0 751 670 A2 | 1/1997 | H04N/1/10 |
| EP | 0 768 621 A2 | 4/1997 | G06T/5/20 |
| EP | 0 794 454 A2 | 9/1997 | G03B/27/73 |
| EP | 0 816 833 A2 | 1/1998 | G01N/21/88 |
| EP | 0 816 833 A3 | 8/1998 | G01N/21/88 |
| EP | 0 893 914 A2 | 1/1999 | H04N/5/253 |
| EP | 0 930 498 A2 | 7/1999 | G01N/21/88 |
| GB | 2 283 633 A | 5/1995 | H04N/5/262 |
| JP | 4-291139 | 10/1992 | G01N/21/89 |
| JP | 11185028 | 7/1999 | G06T/1/00 |
| JP | 2000-13604 | 1/2000 | H04N/1/409 |
| JP | 2000-196813 A | 7/2000 | H04N/1/04 |
| WO | WO 84/02019 | 5/1984 | G06F/15/20 |
| WO | WO 89/06890 | 7/1989 | H04N/3/36 |
| WO | WO 90/01240 | 2/1990 | H04N/1/40 |
| WO | WO 91/09493 | 6/1991 | H04N/5/127 |
| WO | WO 92/05469 | 4/1992 | G03B/27/53 |
| WO | WO 95/15530 | 6/1995 | G06F/17/14 |
| WO | WO 97/16028 | 5/1997 | H04N/7/30 |
| WO | WO 98/31142 | 7/1998 | H04N/5/253 |
| WO | WO 98/34397 | 8/1998 | |
| WO | WO 99/40729 | 8/1999 | H04N/9/11 |
| WO | WO 01/48694 | 7/2001 | G06T/5/00 |

OTHER PUBLICATIONS

*Adaptive–neighborhood filtering of images corrupted by signal–dependent noise*, Rangaraj M. Ranagayyan et al., Applied Optics, vol. 37, No. 20, Jul. 10, 1998 pp. 4477–4487.

*Grayscale Characteristics*, Photographic Negatives The Nature of Clor Images, pp. 163–168.

*Digital Imaging Equipment White Papers*, Putting Damaged Film on Ice, A Technical Discussion of Advances in Digital Imaging, Nikon Corporation, Http://www.nikonusa.com/reference/whitepapers/imaging/ditechdisc.html, Aug. 5, 1999.

*Local Cosine Transform —A Method for the Reduction of the Blocking Effect in JPEG*, Gil Aharoni, et al., Journal of Mathematical Imaging and Vision, 3, pp. 7–38, 1993.

*Digital ICE™ Technology*, Applied Science Fiction, Inc., http://www.asf.com/html/o$_A$_ products/iceprod.html Aug. 5, 1999, 1 pg.

*About Digital ICE™ Technology*, Applied Science Fiction, Inc., http://www.asf.com/html/o_products/icetech.html. Aug. 5, 1999, 2 pgs.

*2–D Adaptive Volterra Filter for 2–D Nonlinear Channel Equalisation and Image Restoration*, J.N. Lin, et al., Electronics Letters, vol. 28, No. 2, Jan. 16, 1992, pp. 180–182.

Author: Thomas A. Dundon, et al., "Scanner and Method", specification (23 pages) and drawings (1 pages)(021971.0150), Filed Apr. 18, 2000.

Author: Albert G. Edgar, et al., "System and Method for Correcting Defects in Digital Images Through Selective Fill–In from Surrounding Areas", specification (21 pages) and drawings (3 pages), Filed Oct. 5, 2000.

* cited by examiner

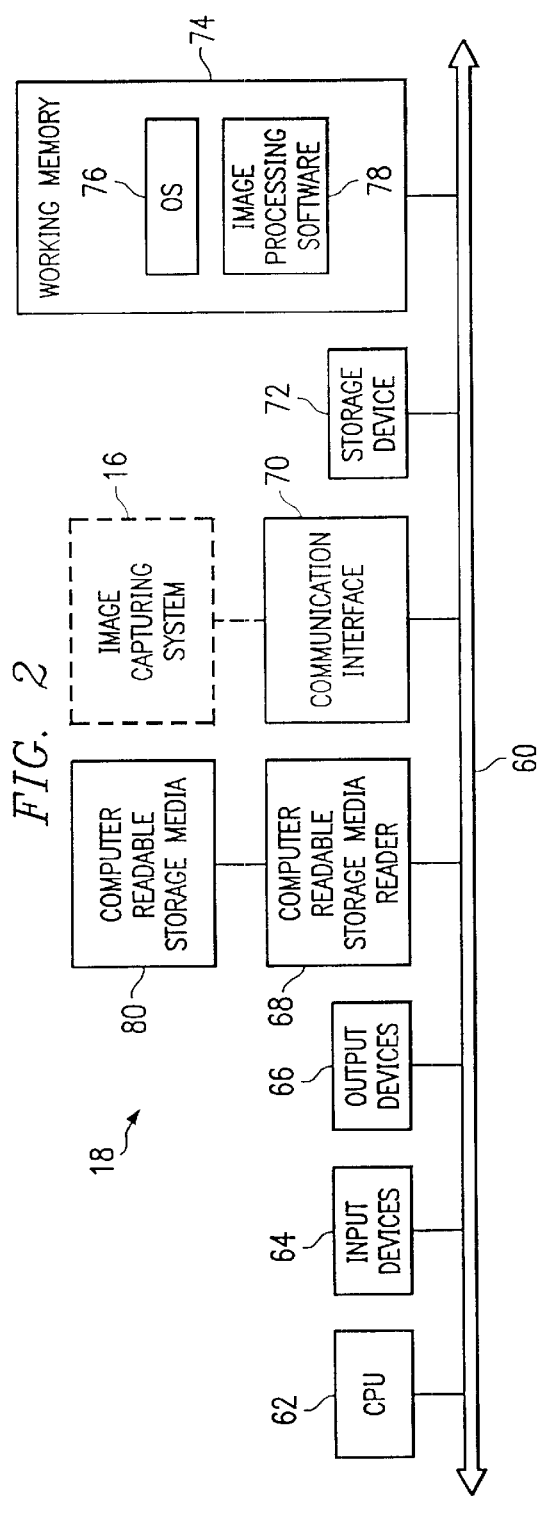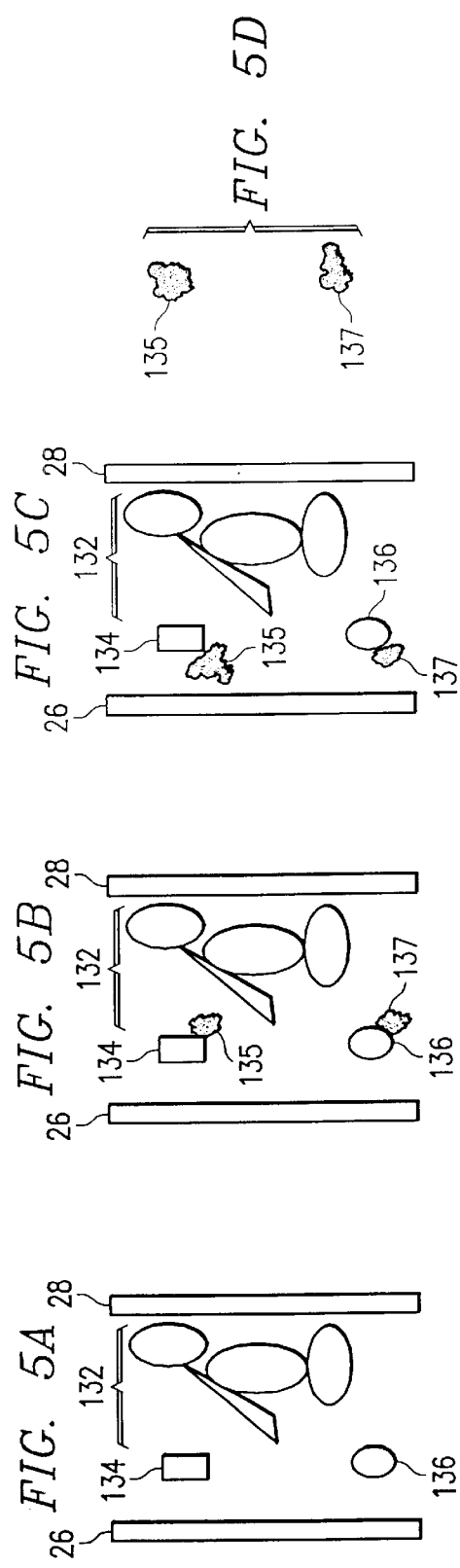

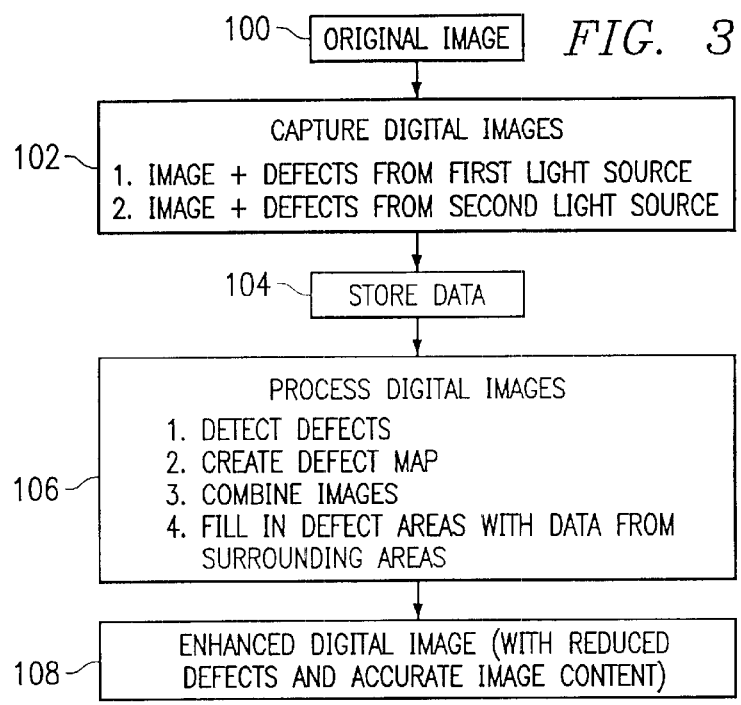
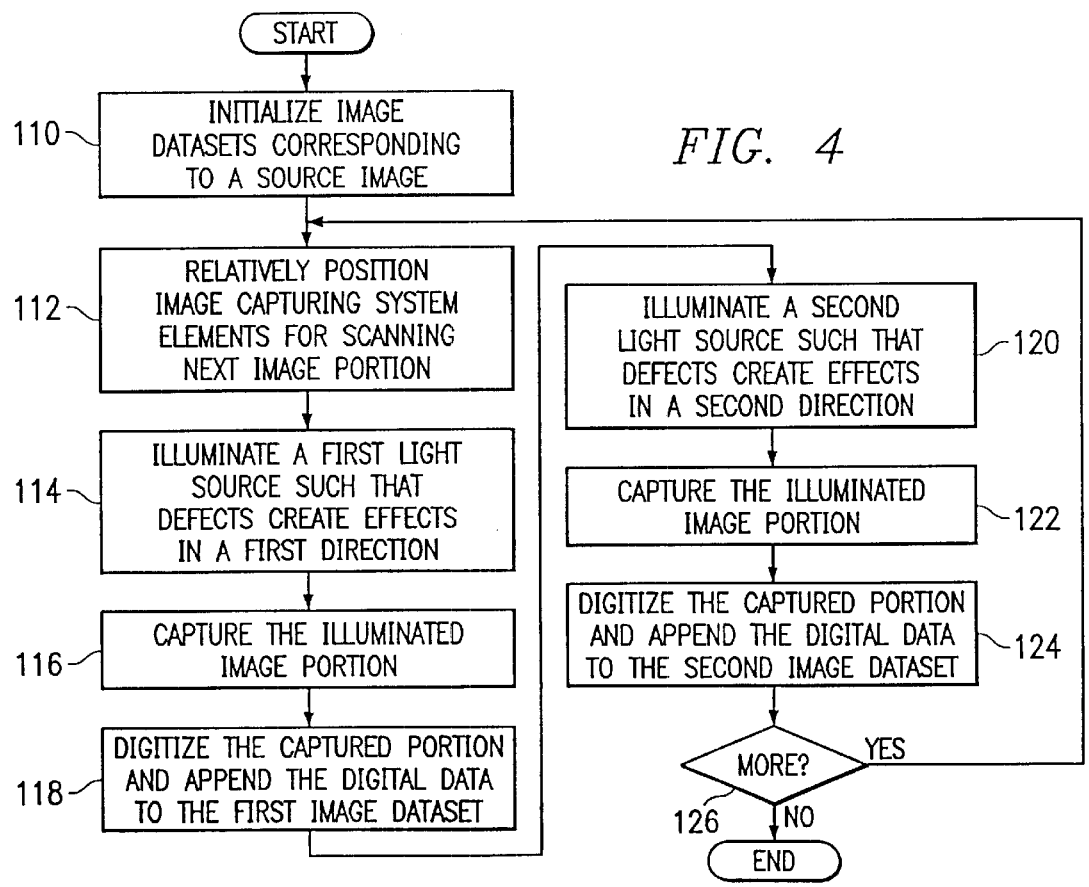

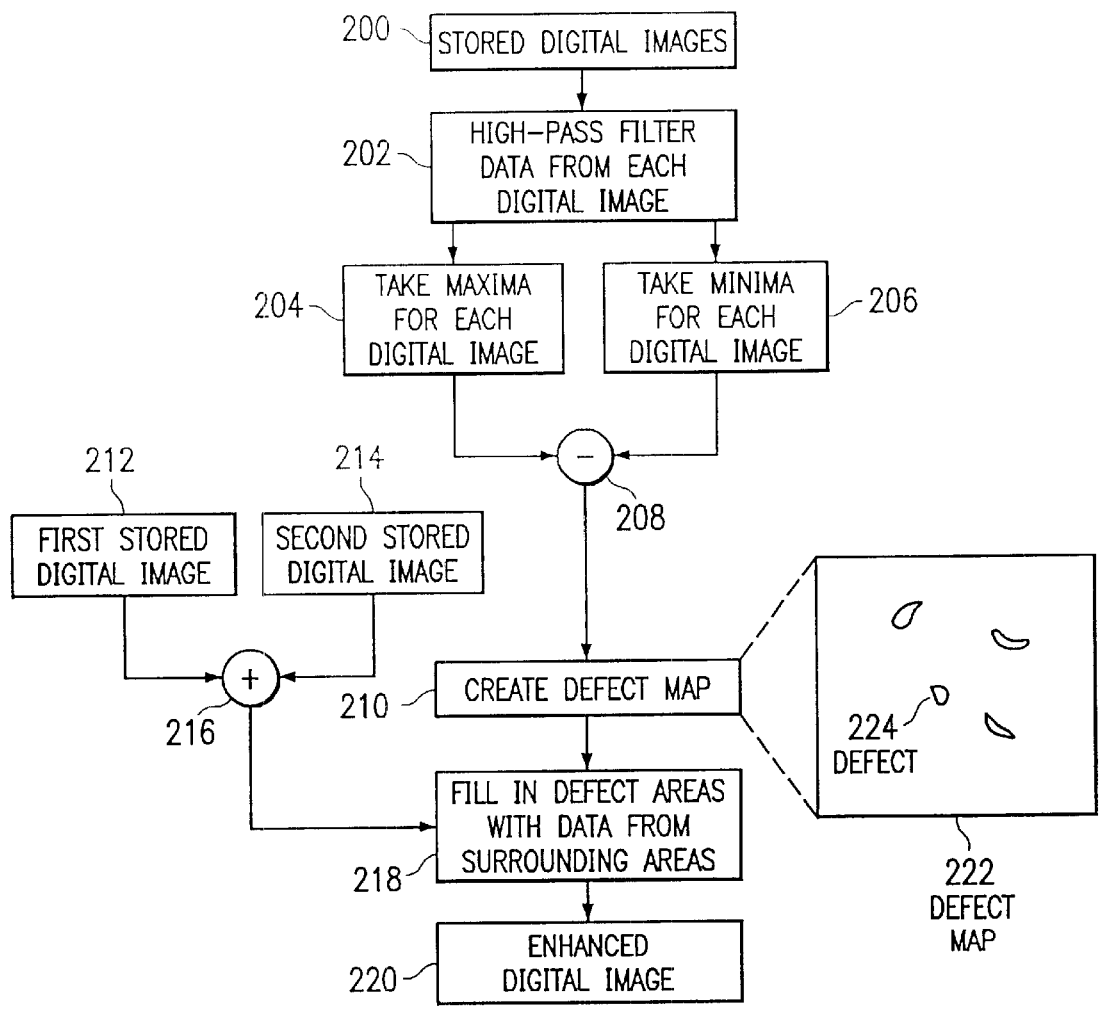

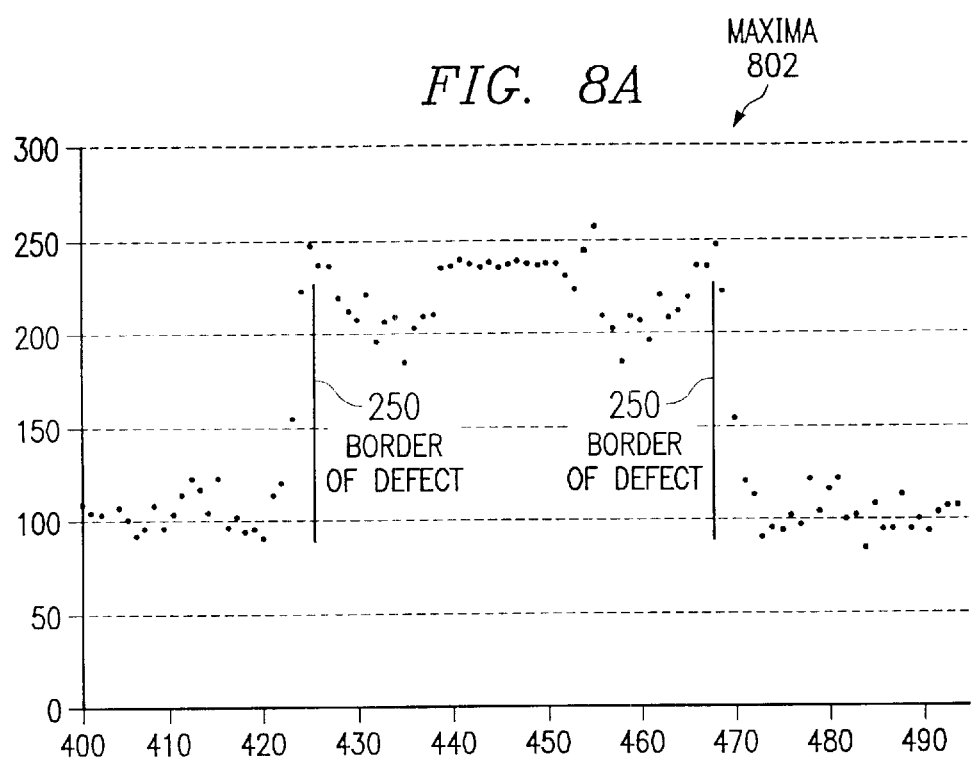
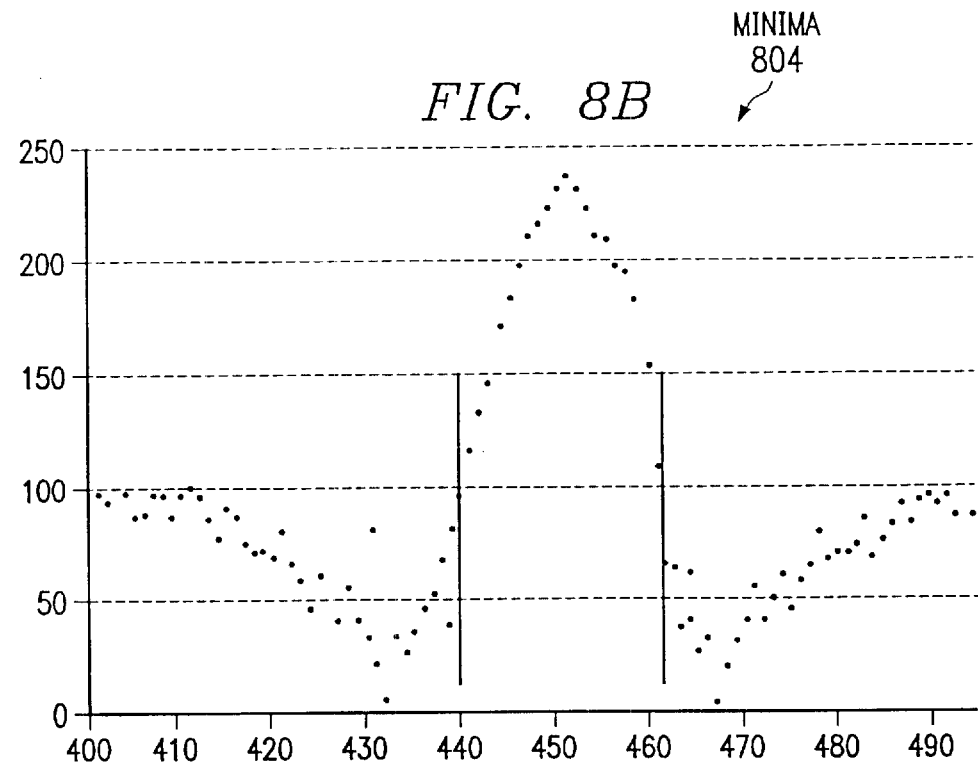

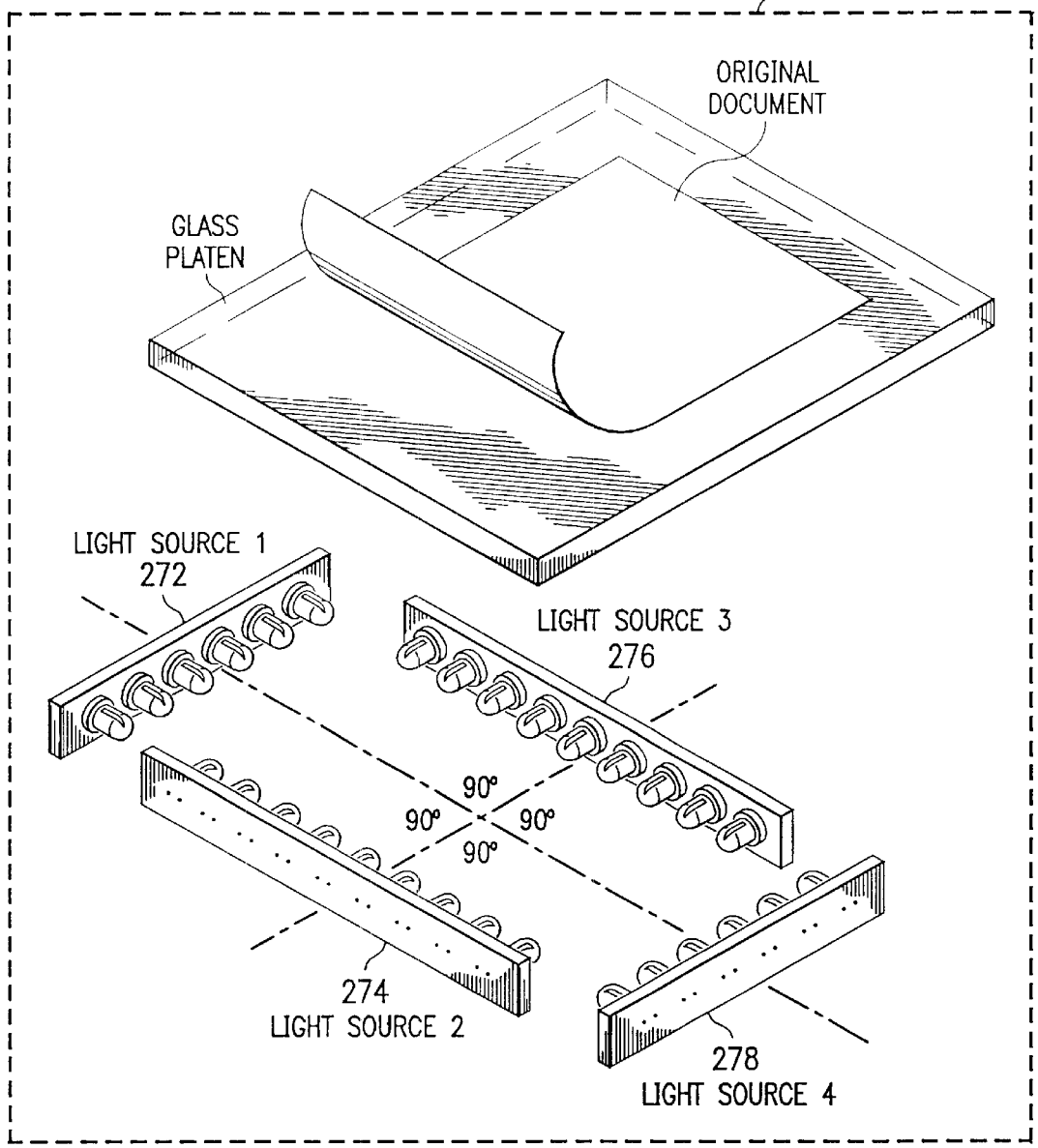

METHOD AND APPARATUS FOR DIFFERENTIAL ILLUMINATION IMAGE-CAPTURING AND DEFECT HANDLING

PRIORITY APPLICATIONS

This application claims priority under 35 U.S.C. §119(e) to provisional application Ser. No. 60/158,672 filed Oct. 8, 1999, entitled "Method and Apparatus for Differential Illumination Image-capturing and Defect Handling" and provisional application Ser. No. 60/158,710 filed Oct. 8, 1999, entitled "Method and System for Defect Detection Using Differential-Illumination."

CROSS REFERENCE OF RELATED APPLICATIONS

This application is related to co-pending application Ser. No. 09/552,473, entitled "Scanner and Method" by Ford et al. and co-pending application Ser. No. 09/679,990, entitled "System and Method for Correcting Defects in Digital Images Through Selective Fill-In From Surrounding Areas" by Edgar et al.

TECHNICAL FIELD OF THE INVENTION

This invention relates to the field of image processing, and more particularly to a method and apparatus for differential illumination image-capturing and defect handling.

BACKGROUND OF THE INVENTION

Image scanners, such as flatbed scanners, are widely used to convert documents, such as papers, images, photographs, negatives and the like, into electronic representations of the document or digital images. This is typically done by placing the document on a glass platen, illuminating the document with visible light and moving an imager relative to the document to record the intensity of light reflected from each minute location of the document and to process that information to form the digital image of the document. The digital image can then be stored, altered electronically, or printed.

A drawback of a conventional scanning system is that defects on the document such as dust, lint, and scratches, as well as defects in the scanning system, such as platen scratches, smudges, dust and fingerprints result in a degraded electronic representation or digital image. Also, when scanning matte finished photographs, many conventional scanners have a tendency to produce lines in the digital image. This is because matte finished photographs have a raised surface texture that causes shadows to be cast in between the raised area.

SUMMARY OF THE INVENTION

Accordingly, it may be appreciated that a need has arisen for a method and system for reducing defects in a digital image. In accordance with the teachings of the present invention, a method and system for differential illumination image-capturing and defect handling is provided which substantially eliminates or reduces the disadvantages and problems associated with conventional imaging systems.

In one embodiment of the present invention, an image processing system is provided. The system includes a first light source operable to illuminate a document in a first direction and a second light source operable to illuminate the document from a second direction. Also included is a sensing device operable to detect light from the first and second light sources after interaction with the document. A processor receives information from the sensing device and produces an image and image defects.

In another implementation of the present invention, a method for determining defects on a document is disclosed. In a first step, a first image record based on light influenced by the document from a first light source is obtained. In a second step, a second image record based on light influenced by the document from a second light source is obtained. Next, a maximum pixel intensity record is obtained by comparing the first and second image records and selecting the highest pixel intensity value for a given pixel location. Then, a minimum pixel intensity record is obtained by comparing the first and second image records and selecting the lowest pixel intensity value for a given pixel location. Next, a difference record is obtained by subtracting the minimum pixel intensity record from the maximum pixel intensity value. Next, the center of a defect region is obtained by locating localized minimums in the difference record. Finally, defect boundaries are determined based on the difference record.

The present invention provides various technical advantages over conventional imaging systems. For example, one technical advantage is that the effects of defects can be substantially removed from a digital image. Another technical advantage is that documents with textured surfaces can be scanned more accurately then with many conventional systems. Another technical advantage is that at least two image datasets, corresponding to illumination from at least two separately illuminated light sources can be acquired. Other technical advantages will be readily apparent to one skilled in the art from the following figures, descriptions and claims.

BRIEF DESCRIPTION OF THE DRAWINGS

For a more complete understanding of the present invention and the advantages thereof, reference is now made to the following description taken in conjunction with the accompanying figures, in which like reference numbers represent like parts and in which:

FIG. 2 illustrates the components of a data-processing system in accordance with the teachings of the present invention;

FIG. 3 is a flowchart illustrating the overall operation of the image defect correction system in accordance with the teachings of the present invention;

FIG. 4 is a flowchart illustrating the capturing of a digital image in accordance with the teachings of the present invention;

FIG. 5a is a simplified illustration of the image defect correction system, FIG. 5b illustrates a document illuminated by a first light source, FIG. 5c illustrates a document illustrated by a second light source, FIG. 5d illustrates a defect map;

FIG. 7 is a flowchart illustrating the processing of forming digital images in accordance with the teachings of the present invention;

FIG. 8a is a density plot illustrating a maximum pixel intensity for a pixel location, FIG. 8b is a density plot illustrating a minimum pixel intensity for a pixel location.

DETAILED DESCRIPTION OF THE INVENTION

Figure 1:
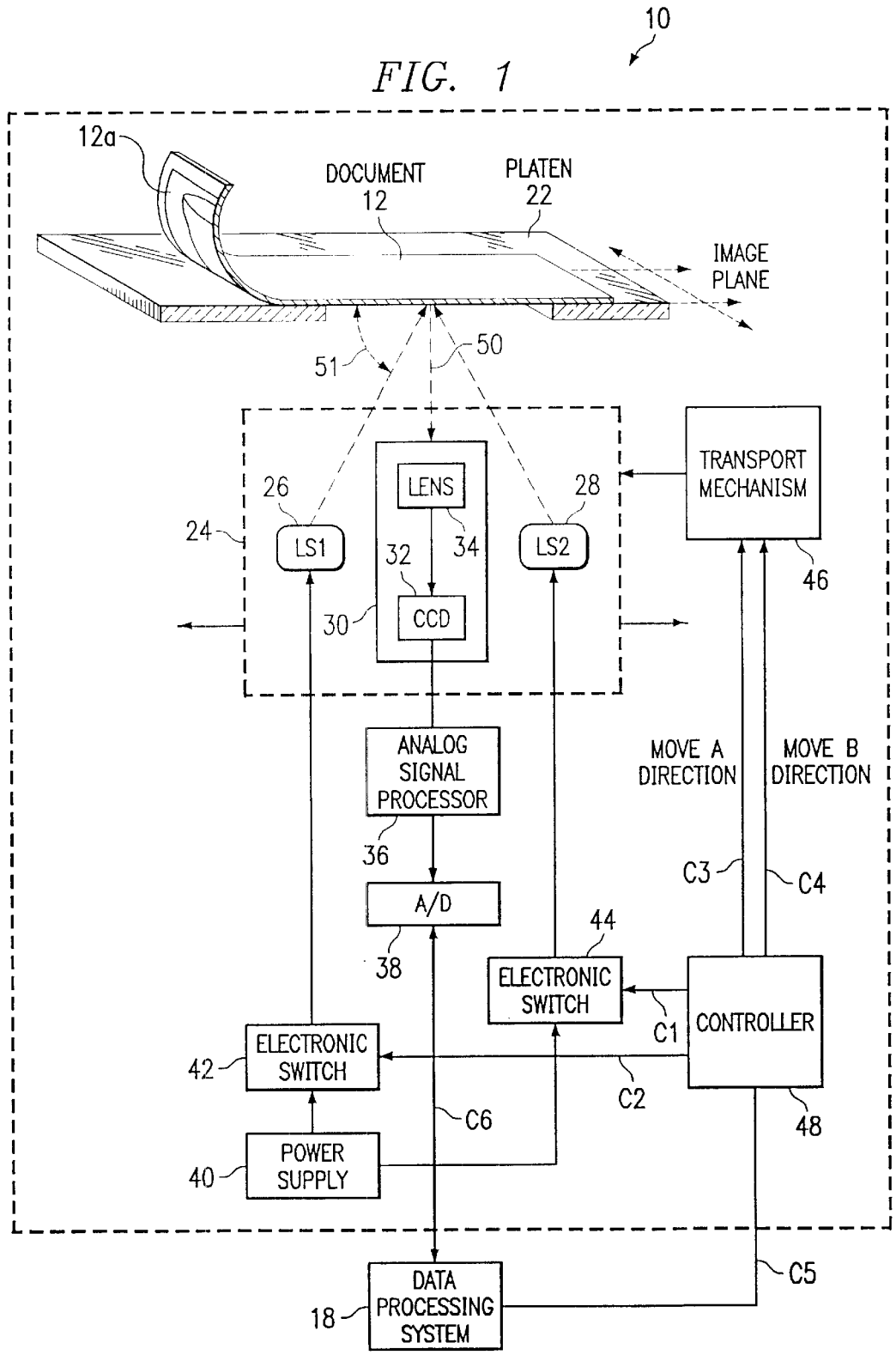
FIG. 1 illustrates one embodiment of an image defect correction system in accordance with the teachings of the present invention.

FIG. 1 illustrates one embodiment of the image defect correction system 10 in accordance with the teachings of the present invention. System 10 includes a scanner 16 that operates to capture data from a document 12, such as paper, images, negatives, photographs or any other reflective medium. Scanner 16 can be a line scanner, a flatbed scanner or other suitable type of imaging system. An example of such a scanner is the EPSON™ 836 scanner. The data captured from system 10 is generally processed by an external data-processing system 18. An example of such a data-processing system is a general purpose computer, such as a personal computer, that operates using program instructions to carry out the operations and functions discussed herewithin.

Scanner 16 generally includes a glass or similarly clear platen 22. Document 12, the document to be scanned, is placed on top of platen 22. Document 12 has an image side 12a, which will be digitally recorded by scanner 16. Scanner 16 further comprises an imaging subsystem 24. In this embodiment, imaging subsystem 24 includes a first light source 26, a second light source 28, and a sensing device 30. Sensing device 30 is operable to capture image data from image side 12a produced by light reflected from first light source 26 and light reflected from second light source 28. In one embodiment, sensing device 30 comprising a detector 32 and an optical system 34. Optical system 34 is operable to focus the reflected light from document 12 onto detector 32 in such a manner that detector 32 can record the image data from document 12. In a particular embodiment, detector 32 is a charge coupled device (CCD). However, detector 32 maybe any suitable type of light sensing device. For example, detector 32 may be a CMOS detector, a photoresistor, a phototransistor and the like. As is well known in the art, the detector 32 will, for a color image, have distinct red, green and blue sensor portions. Note that red, green and blue is meant to be any equivalent representation of those colors in any color space such as CMYK, XYZ, LAB, or any other equivalent color space. Color spaces are different ways to represent the red, green and blue colors.

Depending on the type of detector 32 used, scanner 16 may further comprise an analog signal processor 36 and an analog- to-digital converter 38. Analog signal processor 36 and analog to digital converter 38 are needed if sensing device 30 outputs an analog signal in order to convert the analog signal to a digital signal for processing and storage. Also included with scanner 16 is a power supply 40, a first electronic switch 42, and a second electronic switch 44. First electronic switch 42 is operable to control first light source 26 and second electronic switch 44 is operable to control second light source 28. Transport mechanism 46 is used to control the movement of imaging subsystem 24. Controller 48 controls first electronic switch 42, second electronic switch 44, and transport mechanism 46. Controller 48 is, in one embodiment, a programmable micro-controller such as a MC68HCO5 made by Motorola.

In one embodiment, first light source 26 and second light source 28 are implemented as fluorescent light sources. In a particular embodiment first light source 26 and second light source 28 are positioned on opposing sides of a scan line 50, as illustrated in FIG. 1. In this embodiment, each light source, first light source 26 and second light source 28, are illuminated at separate times. In operation, illumination from first light source 26 will illuminate image side 12a of document 12 and will also illuminate any defects on image side 12a of document 12 and/or platen 22. The illumination of defects will create effects (such as shadows) towards the right. Similarly, light from second light source 28 will illuminate image side 12a of document 12 and cause defects to create effects towards the left. Sensing device 30 will capture the image data created by each of the light sources including image information and defect effect information.

First light source 26 and second light source 28 produce light in accordance with application of power from power supply 40 via first electric switch 42 and second electric switch 44. Controller 48 connects to first electronic switch 42 via control line C-2 and second electronic switch 44 connects to controller 48 via control line C-1. In this manner, controller 48 can control the operation of first electronic switch 42 and second electronic switch 44. First electronic switch 42 and second electronic switch 44 can comprise transistors and/or relays or other devices well known in the art to control illumination from a light source. In a typical application, only two states (or levels) of light are needed. For example, when the light sources are fluorescent lamps, the two states are a low intensity level and a high intensity level. This is due to the fact that since fluorescent lamps take a long time to warm up they are usually left in a low intensity level when not in use. Therefore, when a light source is in the off position, in one embodiment, the light source is actually illuminated at a low intensity. The on state represents a higher intensity level than the off state. With light sources other then fluorescent light source, off may actually be a state where there is no illumination. For the purposes of the present invention, the on state represents a higher intensity level than the off state. Other states may be used for calibration purposes or for specialized needs.

In the preferred embodiment first light source 26 is placed at a first angle of 30°–70° from the image plane and second light source 28 is placed at a second angle of 110°–150° from the image plane to produce optimal results. When the angles become too large, i.e., tend towards the perpendicular, specular reflection or glare often diminishes the ability to distinguish the effects of defects. On the other hand, too small an angle often results in a raking-like effect which tends to overemphasize smaller, otherwise insignificant surface protrusions. Therefore, it is preferable to place the light sources at different angles on the axis perpendicular to the document 12 to be scanned.

Data-processing system 18 is preferably an external processing system, such as an external computer running software elements, operable to receive and process captured image data. An example is a personal computer with an Intel Pentium III processor connected to scanner 16 via a universal serial bus. In one embodiment, data-processing system 18 communicates with and controls the image-capturing system. Connection C-5 connects data-processing system 18 to controller 48. This allows for data-processing system 18 to control controller 48 and thereby control the operation of first electronic switch 42, second electronic switch 44 and transport mechanism 46. Transport mechanism 48 in an embodiment is operable to move imaging subsystem 24 along document 12 in order to capture the entire document. In another embodiment transport mechanism 48 is operable to move platen 22, which holds document 12, over sensing device 30.

Data-processing system 18 couples to analog-to-digital converter 38 via line C-6. This is done so that data-processing system 18 can receive data detected by sensor 30. Of course, if sensing device 30 directly captures digital information, analog-to-digital converter 38 would not be needed and a direct connection can be made between sensing device 30 and data-processing system 18. The previous discussion is only an example of how data-processing system 18 might interface with controller 48 and sensing device 30. Those skilled in the art will realize that other manners of transferring and receiving data can be used. For example, some or all control can be included internal to scanner 16.

FIG. 2 illustrates the components of data-processing system 18. Data processing system 18 preferably comprises processing system elements coupled via a bus 60. These elements include: a CPU 62; input devices 64; output devices 66; communication interface 70; storage device 72; memory 74, such as random access memory or read-only memory, or both; and computer-readable storage media reader 68. Memory 74 preferably comprises a working memory which contains an operating system 76 such as Windows 98, UNIX, LINUX, Windows NT, or any other computer operating system as well as image-processing software 78. Image-processing software 78 is operable to manage image datasets generated by scanner 16 in accordance with the present invention. Computer-readable storage media reader 68 couples to computer-readable storage media 80 which includes local remote storage devices and a memory operable to store information. Communication interface 70 is operable to connect to an image capture system such as scanner 16. Communication interface 70 is operable to both send and receive information to and from scanner 16. In one embodiment, communication interface 70 is a universal serial port interface, although other interfaces can also be used.

Data-processing system 18 can be set up to automatically process captured image data through a digital image and a defect map and then to correct the defects using the defect map and digital image. Also, parameters can be supplied or developed by data-processing system 18 to be used in conjunction with the system. Additionally, a user can interact with data-processing system 18 via input device 64 such as a keyboard. This can be used to control the image data processing and for reviewing and/or modifying process parameters. Such activity is well known in the art.

FIG. 3 is a flowchart illustrating the overall operation of system 10. In step 100, document 12, such as a film print, is placed on the platen 22 of scanner 16, as illustrated in FIG. 1. In step 102, at least two digital images are captured by data-processing system 18. These two digital images correspond to a first digital image produced by first light source 26 impinging on document 12 and a second digital image produced by second light source 28 impinging on document 12. In one embodiment, sensing device 30 is passed over the entire document before data processing begins. In an embodiment, image data produced by first light source 26 impinging on document 12 is captured. Then the image data produced by second light source 28 impinging on document 12 is captured. Alternatively, first light source 26 and second light source 28 can alternate as sensing device 30 moves in such a way as a portion of document 12 is captured as image data each time the first light source 26 and second light source 28 alternates. In this manner, image and defect information is obtained in a single scan of the entire document 12. In other embodiments, processing can start immediately upon scanning a part of document 12 while other parts of document 12 are scanned. When sensing device 30 is used to capture both digital images, it is inherently in register for both image and defect sensing no matter which light source is used.

When image side 12a of document 12 is scanned, data is obtained from each of a plurality of pixels that scanner 16 is capable of detecting. A pixel is an individual, discrete digital sample of scanner 16. The greater the number of pixel per unit areas that can be directly obtained to represent document 12, the more surface defects are detected. For example, a scanning resolution of 2000 pixels by 3000 pixels is typically considered by those skilled in the art to be full resolution range from 35 mm film. For a color image, a scanned pixel contains multiple samples; one for each color sub-sample such as red, green and blue. The greater the number of pixels per unit area, the greater clarity of the resulting image, all things being equal. Each pixel is represented by a plurality of bits. Typically, an 8 bit byte represents the intensity of light of a given color (e.g., red, green or blue) at a given pixel. Thus, 24 bits are typically used to represent each pixel in a color image. While it is desirable to have greater resolution, this leads to an undesirable increase in the number of defects captured. Therefore, an advantage of this embodiment of the present invention is to remove the defects while leaving a high resolution image.

FIG. 4 illustrates step 102 of FIG. 3 in detail. While the example given in FIG. 4 is of a single pass scanner, those skilled in the art will know that other ways of capturing image and defects are possible. For example, in step 110, data-processing system 18 initializes the creation of two image datasets where image information may be stored. One dataset is for data produced by first light source 26, the other data set for data produced by the second light source 28. In step 112, controller 48 causes transport mechanism 46 to create relative movement between sensing device 30 and document 12, thereby creating relative positioning for capturing a source image. In one embodiment, imaging subsystem 24 is moved by transport mechanism 46 over document 12. In conjunction with creating such relative positioning, controller 48 causes power to be applied to first light source 26, but not to second light source 28. This illuminates document 12 and causes any defects corresponding to document 12 or the platen 22 to create effects in a first, rightward direction as will be explained further in conjunction with FIG. 5a.

While illuminated, image information (preferably comprising image, defect and defect effect data) is collected by sensing device 30 in step 116. In step 118, the image data is converted to digital image data and appended to the first image dataset. In cases where sensing device 30 produces a direct digital output the step of converting the digital data would not be necessary and the information can be directly appended to the first imaged dataset.

In step 120, controller 48 causes second light source 28 to illuminate while holding first light source 26 in an off (or low intensity) position. This illuminates document 12 and causes any defects corresponding to such document 12 to create effects in a second direction, i.e., leftward, as explained in more detail with reference to FIG. 5b. Then, in step 122, the image side 12a of document 12 is captured by sensing device 30 and, in step 124, the image data is converted to a digital form and appended to the second image dataset. Thereafter, in step 126, if more of document 12 needs to be captured, the process continues again at step 112.

FIG. 5a is a simplified illustration of system 10 in accordance with the teachings of the present invention. Illustrated is an image 132 on document 12 with a first defect 134 and a second defect 136, such as a piece of dirt or a scratch. Also illustrated is first light source 26 and second light source 28. The illustration in FIG. 5a is for exemplary purposes only and other arrangements and configurations of light sources and images would be apparent to those skilled in the art.

FIG. 5b illustrates the system of FIG. 5a with first light source 26 in the on (or high intensity) position. When first light source 26 is on, it illuminates image 132 and first defect 134 and second defect 136 at an angle from the left hand side. This produces a first defect shadow 135 and a second defect shadow 137 to the right of first defect 134 and second defect 136. No shadow is produced by image 132 since it is flat on the document.

FIG. 5c illustrates the system of FIG. 5a where second light source 28 is in the on (or high intensity) position. When second light source 28 is on, it illuminates image 132 and first defect 134 and second defect 136 at an angle from the right hand side. This produces a first defect shadow 135 and a second defect shadow 137 to the left of first defect 134 and second defect 136. No shadow is produced by image 132 since it is flat on the document.

The results of scans using both light sources, 26 and 28, are combined and analyzed by a processor. The result isolates the defects as seen in FIG. 5d which illustrates the shadow of the defects isolated from the image. This "defect map" can then be used to achieve a digital image of document 12 substantially free from defects.

Figure 6A:
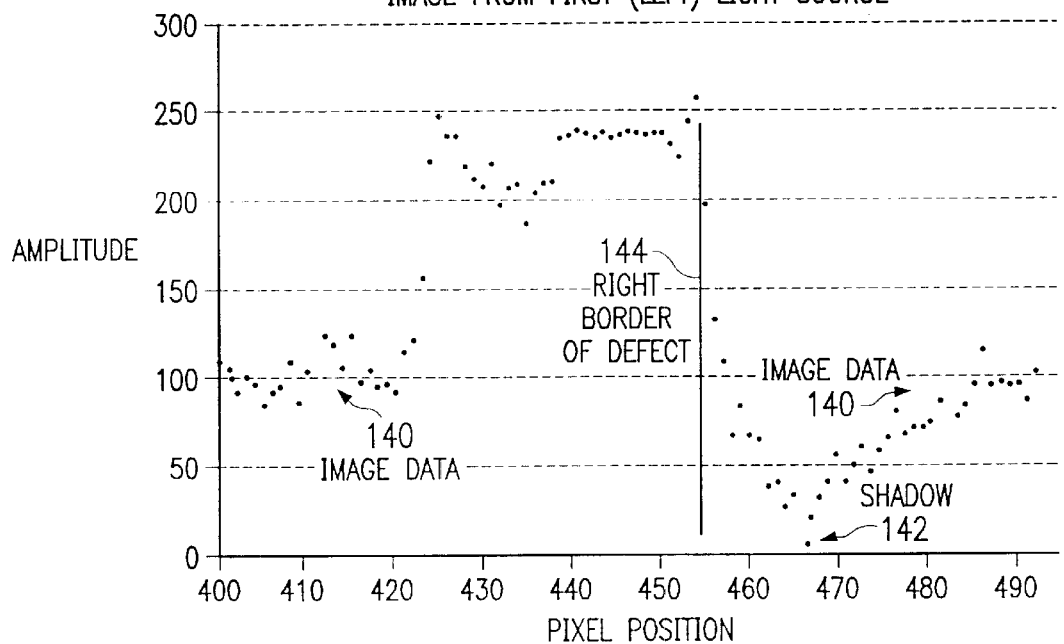
FIG. 6a is a density plot illustrating pixel intensity when illuminated from a first light source.
Figure 6B:
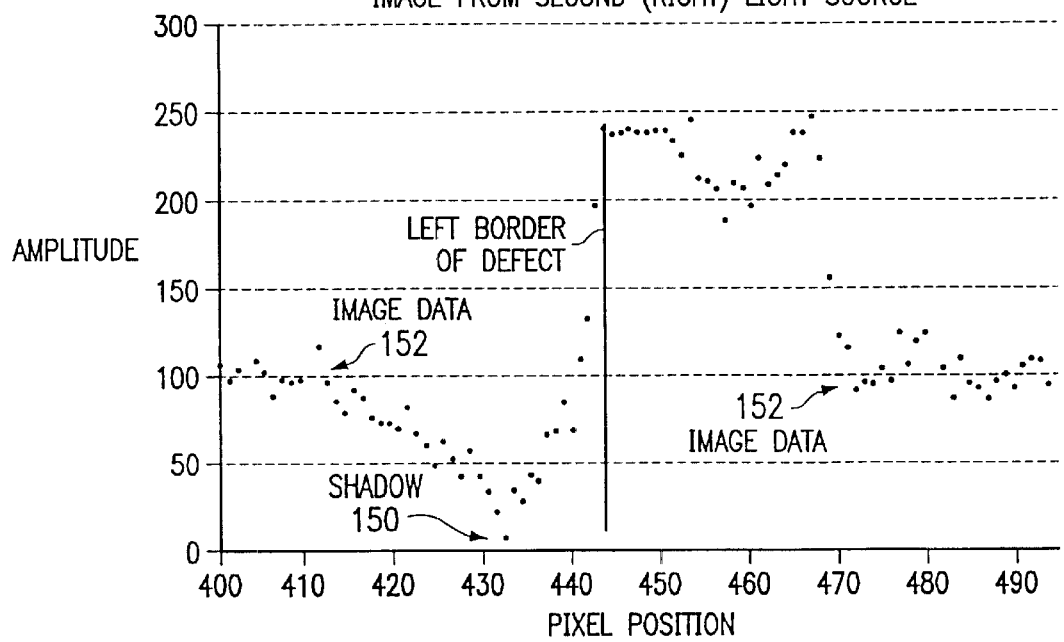
FIG. 6b is a density plot illustrating pixel intensity when illustrated from a second light source.

FIGS. 6a and 6b represent spatial density plots showing digital data captured in response to the illumination of first light source 26 and second light source 28. The density plots are plotted by pixel amplitude and by pixel position. FIG. 6a represents data recorded in response to first light source 26 which was placed on the left side of the image. Image data 140 is shown as the data with amplitudes in the range of 80 to 125 for pixel positions 400 through approximately 425. Data for defects 142 is shown as the pixel positions by approximately 435 on to nearly 490 which shows an amplitude dropped in value from pixel position 450 to pixel position 468. This represents a shadow which falls to the right of the defect. A shadow is typically caused when light is reflected before reaching part of an image, or is blocked before it reaches part of an image, such that the amplitude of light from a portion of the image is reduced. After position 468, the amplitude of light rises until it reaches the level of the image data again around position 480. Therefore, a right boundary 144 for a surface defect can be established at position 455 based on the shadow position.

FIG. 6b illustrates the data record response of second light source 28. This density plot shows a reverse pattern than from the one shown in the previous density plot. Image data 152 is shown with an amplitude between 80 and 125 at pixel values 470 to around 500. The drop in amplitude for pixel positions after 445 to nearly pixel position 220 at pixel position 432 represents a shadow falling to the right of the image cast again from a defect such as a piece of dust. After position 432, the amplitude rises into each level of the image dataset around pixel position 420. Thus, a left boundary 154 for a surface defect can be established at substantially position 445 based on the shadow position.

With respect to FIGS. 6a and 6b, it should also be noted that pixel intensity values that allows the creation of such density plots will be obtained for each of the colors scanned with respect to the same group of pixels. The data representing red, green and blue, as described previously, can be used in a variety of ways, such as individually (only one of red, green and blue from the first image and only one of red, green and blue from the second image used), combined together (such as red, green and blue for each pixel the first image are combined together and red, green and blue for each pixel of the second image are combined together), or in dependence upon other characteristics of the image portion being scanned (such as using only red and blue in the green portion of the image and only red and green in the blue portion of the image for the purpose of creating a defect map).

Turning back to FIG. 4, after capturing digital image data in step 102, data-processing system 18 stores the captured digital image data in step 104 and processes it in step 106. The details of processing data are described in further detail in FIG. 7. Data-processing system 18 detects the effects of surface defects in the captured image to identify the defects in step 106. Thereafter, the identified defects are used in step 108 to create a defect map that shows the boundaries of these defects. Further in step 108, data-processing system 18 applies the defect map to the image and treats the defects as a mask. A mask is an image that selects where and by how much an image is to be altered by subsequent operations. Data-processing system 18 thus applies to defect region some type of correction to fill in defect areas in the combined image with data from surrounding areas. This process reduces the defects in the final, enhanced image, as seen in step 110 of FIG. 4.

The detection and the identity of the defects and the creation of defect maps can occur in a number of ways. In one implementation, those pixels that have a difference between the maxima and minima that is greater than a threshold can be determined to be a defect, and adjacent pixels that have a difference that is also greater than a threshold can be determined to form a defect region. A useful threshold is to measure the mean and standard deviation of the numerical values of pixels of the entire image and then setting the threshold at a level. For example, in one embodiment, the threshold is set at three standard deviations from the mean.

FIG. 7 is a flow chart illustrating the processing of forming digital images as described in step 106 of FIG. 4. Initially, in step 200, the stored data images are obtained. In step 202, data-processing system 18 filters the digital data in the datasets for the two digital images captured from the different light sources of each portion of the image. In many applications the data-processing system 18 uses a high-pass filter for filtering. The purpose of the filter is to reduce the effects of irregular light sources shading. Filtering is not needed if the two light sources are perfectly balanced. A variety of filters are known to reduce the effects of irregular light source shading. A useful filter is the difference between the original image and the low-pass version of the image created through a Gaussian filter with a radius of five pixels.

Once the data has been filtered, in steps 204 and 206, the minimum and maximum of the two corresponding pixels and each of the two captured digital images are obtained. The corresponding pixels are the pixels that are sensed from substantially the same physical location on the substrate. The maxima is the highest pixel intensity of the pixel pairs and the minima is the smallest intensity. When red, green and blue signals are captured there would be pixel values for each color channel. In steps 204 and 206, data-processing system 18 finds the maximum and minimum amplitude intensity for the pixel pairs. By obtaining the maxima and the minima, it is possible to obtain density plots of the maximum and minimum. These density plots are illustrated in FIGS. 8*a* and 8*b*.

Figure 8C:
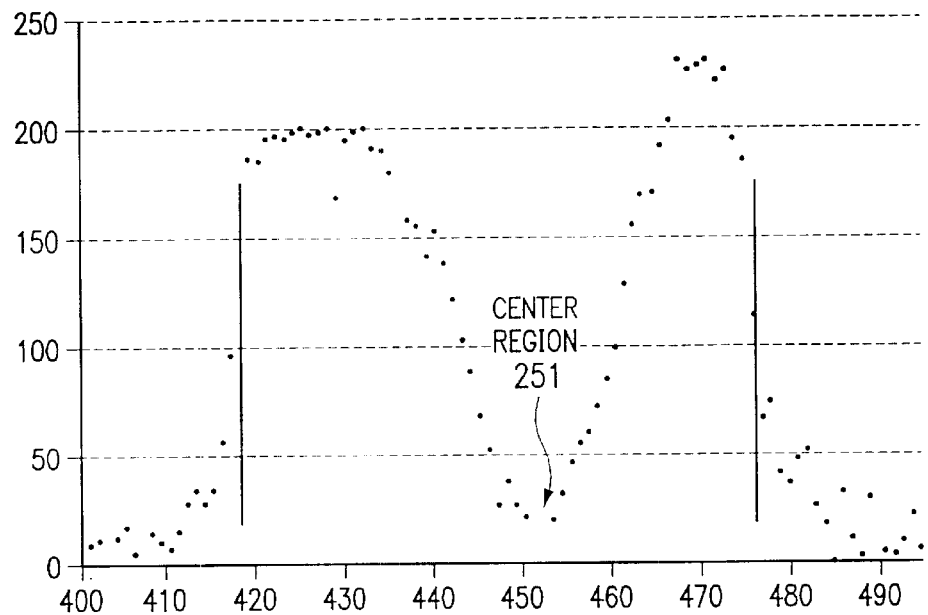
FIG. 8c is a density plot formed by subtracting the maximum values from the minimum values.

FIG. 8*a* illustrates the maximum pixel intensity for each pixel and FIG. 8*b* illustrates the minimum pixel intensity for each pixel. In step 208, the difference between the maximum and minimum is obtained. By obtaining this difference, it is possible to obtain a density plot of the difference between a maximum and a minimum. Such a density plot is illustrated in FIG. 8*c*. As is apparent from FIG. 8*c*, the difference between the minimum and the maximum is a center region 250 having a small difference value which corresponds to the center region of the defect, which on either side of the center region will be a very large difference value. The large value difference exists due to the fact that light from each side of the pixel will cast a shadow in the opposite direction and therefore the difference between the maximum and the minimum on the opposite side of the defects will be large. Note that the operations of steps 204, 206 and 208 can be implemented in a variety of different manners of those skilled in the art. As will be apparent to one of ordinary skill in the art, the maximum of the two pixels minus the minimum of the two pixels is equivalent to the absolute value of one pixel minus the other.

Figure 8D:
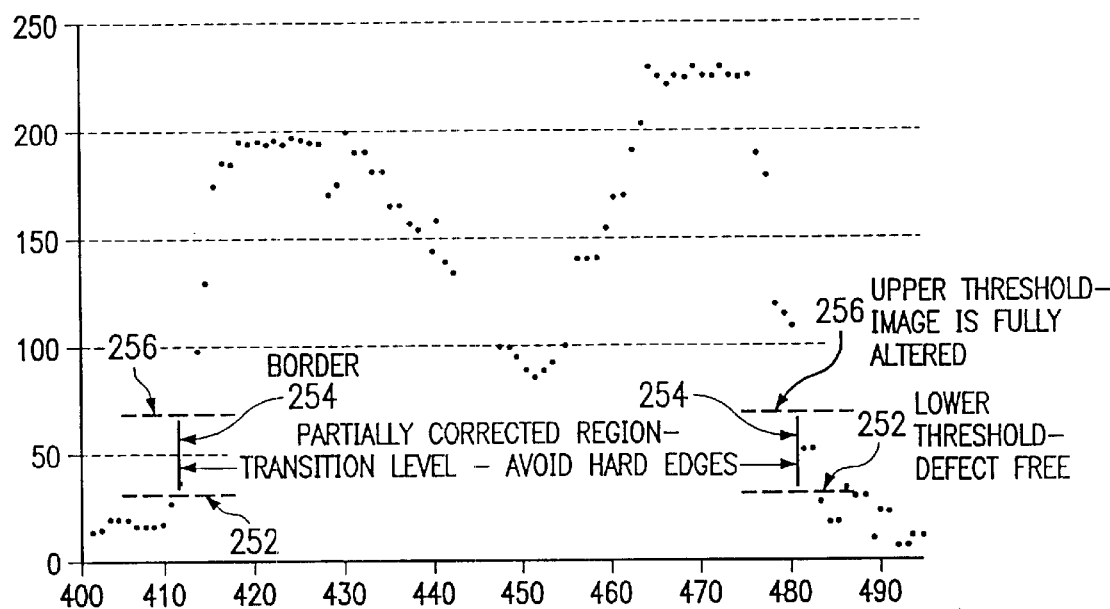
FIG. 8d is a density plot illustrating a defect region.

In step 210, the differences of each pixel are used to create a defect map in which adjacent pixels, each indicative of a defect at the pixel level, are combined. This forms a region of pixels corresponding to a single defect. As can be seen in the difference between the density plots of FIGS. 8*c* and 8*d*, clusters of pixels will be operated upon, such that the maximum pixel difference value in the cluster will be assigned to all the pixels in the cluster, so long as the pixel values do not exceed a lower threshold value 816 such as an amplitude of 35. The lowest threshold value is used to indicate that if a pixel has a value below that threshold it does not contain a defect. The lower threshold value is empirically determined. Using this regional maximum tends to linearize portions of the density plot, which can be seen in FIG. 8*d*, and also aids in establishing more accurate borders 254 of the defect. For example, the first three pixels in FIG. 8*c* have different amplitude values. By considering these pixels to be part of the same cluster, we assign them the same value. This can be seen by examining the first three pixels of 8*d*. These pixels now have the same intensity value. This allows for differences in amplitudes to be determined more distinctly and therefore leads to a more accurate determination of borders.

In determining the defect map, the present invention also applies an upper threshold value 252 to the difference data to obtain a mask of the areas that correspond to a defect. Thus, all pixel locations have a difference value that is greater than the upper threshold value 252, which in this example is 75, will be considered to contain a pure defect and can be fully corrected as described below.

The area between the thresholds, considered to contain a partial defect, will be partially corrected, to avoid hard edges, as described below. While the upper threshold value, with an amplitude of 75, and the lower threshold value, with an amplitude of 35, have been found useful, other values can be used. It should be noted, therefore, that the defect map contains information not only to the presence or absence of defects, but also to the degree to which a defect exists. This helps, as will be appreciated by those of ordinary skill in the art, in blending together regions that do not contain a defect with adjacent regions that do contain a defect. While FIGS. 6*a*, 6*b*, 8*a*, 8*b*, 8*c* and 8*d* illustrate the use of density plots to locate defects, other graphical representations could also be used to analyze the data.

In addition to the line scanner 16 shown in FIG. 1, numerous other image-capturing devices and/or device configurations can also be used in accordance with particular applications and source media for the present invention. For example, such alternatives can comprise drum-type document scanners, film scanners, page scanners, integrated circuit printers, film-developing systems, and other types of image-capturing devices. Such devices might further utilize a wide variety of sensors, sensor components, and sources of electromagnetic radiation, and other components, as is appropriate to a particular application. Many other image-processing alternatives can also be utilized.

Figure 9:
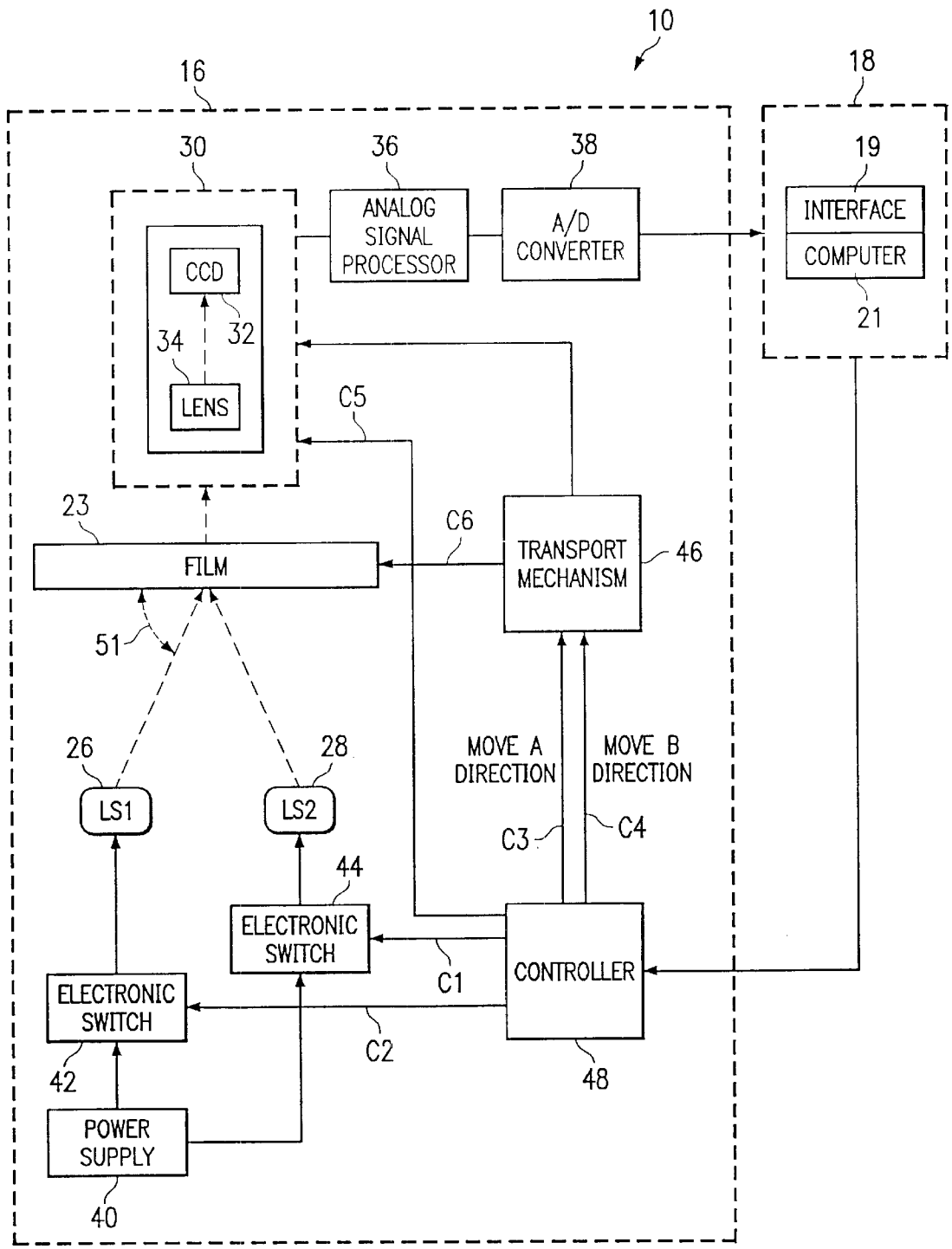
FIG. 9 illustrates an embodiment that captures data from a transparent medium in accordance with the teachings of the present invention.

For example, FIG. 9 illustrates an embodiment with similar components to those in FIG. 1, but that captures data from a substrate that is transparent or semitransparent document (such as film 23 or an overhead projection slide) using a transmissive scanner 12. In this embodiment, the light sources are on one side of the substrate and the sensing device is on the other side of the substrate. The sensing device will detect light from the light sources after interacting with the medium.

Those skilled in the art will also appreciate that alternative scan-cycle configurations can be utilized with line scanner 16 (FIG. 1), as well as with other image-capturing devices. For example, where only two light sources have been discussed previously, more than two light sources can be used to produce multiple datasets that might be useful in identifying defects.

Another example is that scanning can be conducted using "multiple-pass" scanning techniques, i.e., wherein relative positioning corresponds to movement over at least a portion of a source image more than once. Multiple-pass scanning can also be conducted uni-directionally (i.e., where capturing occurs in conjunction with movement in only one direction) or multi-directionally (i.e., where capturing occurs in conjunction with movement in more than one direction). However, image capturing provides at least two image datasets, corresponding to illumination from at least two separately illuminated light sources.

A number of other types of light sources can also be utilized in accordance with a particular application of the present invention, such as light emitting diodes (LEDs), multiple separate light sources, and arrayed light sources. Lights of different wavelengths besides fluorescent, such as infrared (IR), near infrared (NIR), and ultraviolet (UV), can be used. Different wavelengths can be used for each separate light source.

For example, if the substrate is scanned using a light having a wavelength in a part of the spectrum that reflects very little light off a substrate, the present invention tends to distinguish defects where there are specular highlights. If the substrate is scanned using light having a wavelength where the substrate is highly reflective, the present invention tends to distinguish defects by shadows. If the substrate is red, for example, a light source using red light will distinguish shadows, whereas a light source using green light will distinguish the specular highlights. Since most substrates become fairly dark in ultraviolet light, the use of an additional light source of ultraviolet light can be used to distinguish the spectral highlights. Similarly, since most substrates become very light in infrared light, an additional light source of infrared light can be used to distinguish shadows. Accordingly, different combinations of light sources can be used according to the present invention.

Figure 10:
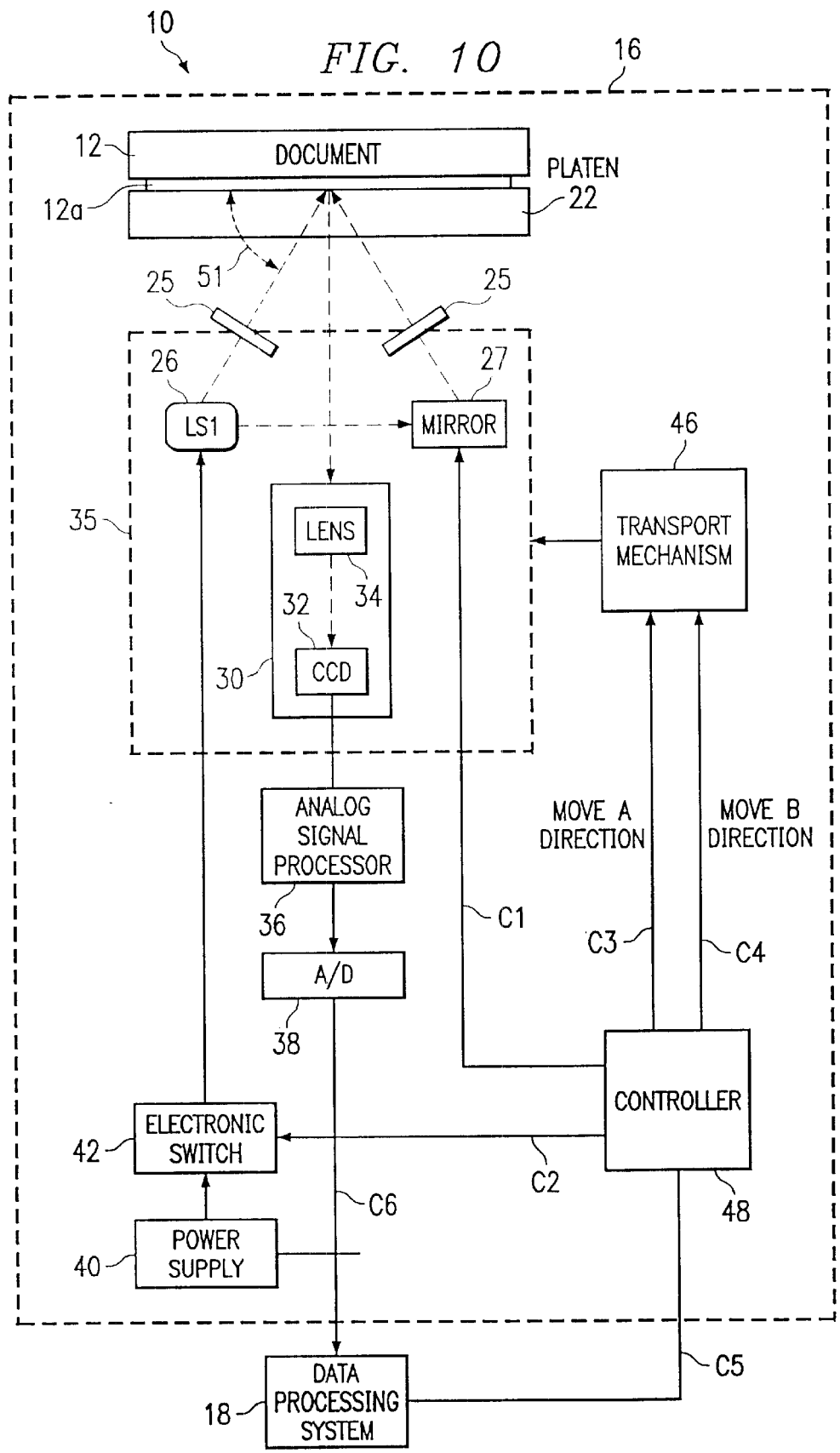
FIG. 10 illustrates an embodiment that captures data from a reflective medium using a mirror as a second light source in accordance with the teachings of the present invention.

In addition, a mirror can be used as a light source by redirecting light from one or more other light sources. For example, FIG. 10 illustrates an embodiment with similar components to those in FIG. 1, but that captures data from a substrate that is a reflective medium 12 using a mirror 27 as a second light source. Controller 48 directs light from a first light source 26 to mirror 27. Two shutters 25 control the illumination from first light source 26 and mirror 27 to permit the capture of two digital images from different positions.

Figure 11:
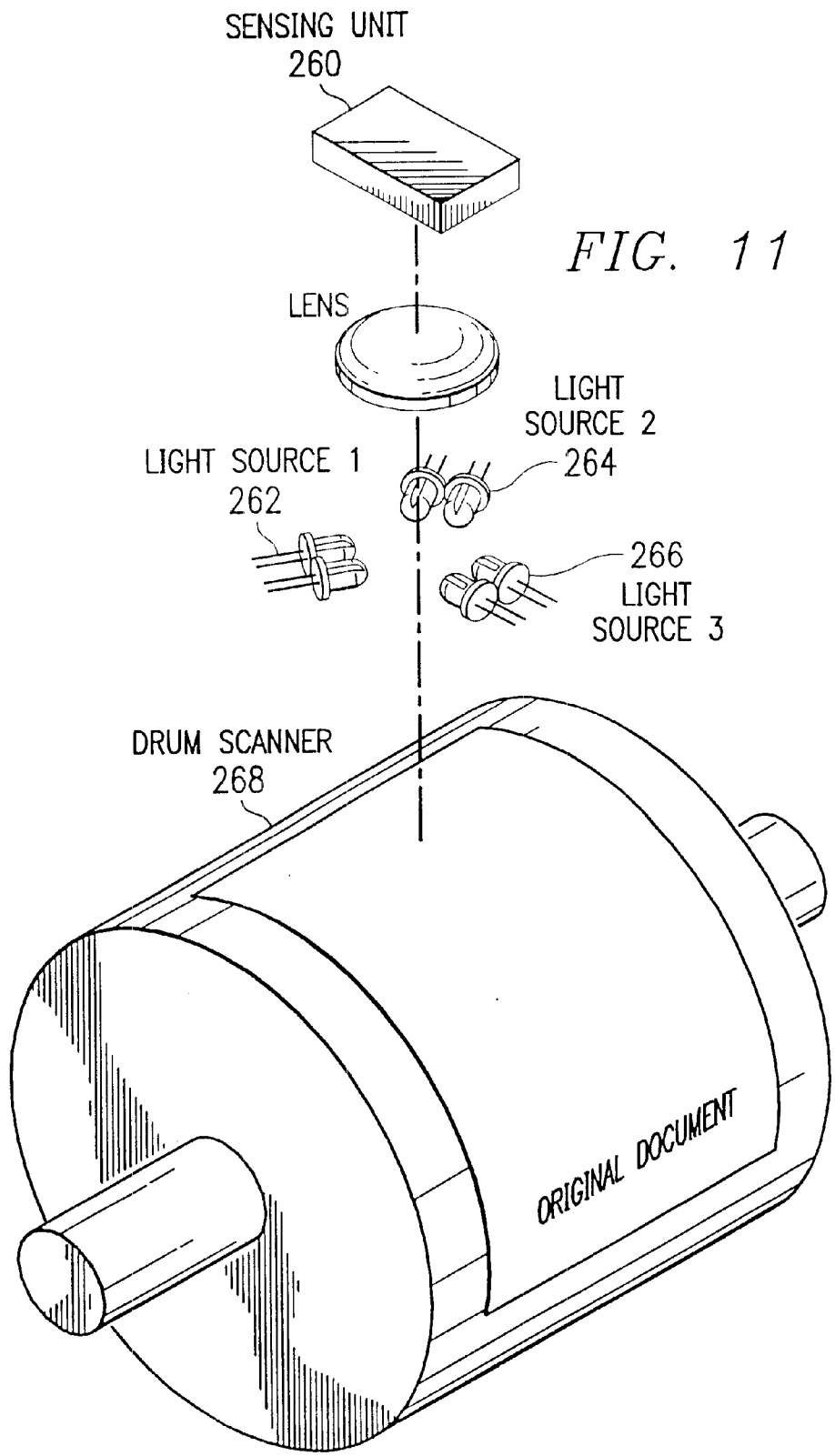
FIG. 11 illustrates an arrangement of three light sources used with a drum scanner in accordance with the teachings of the present invention; and, FIG. 12 illustrates another arrangement of four light sources used with a flatbed scanner in accordance with the teachings of the present invention.

It will also be appreciated that more than two light sources can be used and will be preferred in accordance with certain applications and hardware configurations. With other applications and hardware configurations, more than two lights may be useful. For example, FIG. 11 illustrates an arrangement of three light sources 262, 264, and 266, used with a drum scanner 268. With such an arrangement, the present invention teaches the usefulness of placing the three light sources at angles of approximately 120° from each other. In this arrangement, the maxima and minima of all three light sources for a given pixel can be used to determine the difference that will be used for identification of a defect. FIG. 12 illustrates another arrangement of four light sources used in a flatbed scanner 22 configuration. In this embodiment, the present invention teaches the usefulness of placing the four light sources, 272, 274, 276 and 278, at angles of substantially 90° from each other. In this arrangement, the maxima and minima of all four light sources for a given pixel can be used to determine the difference that will be used for identification of a defect. As will be appreciated, having light from different angles will increase the accuracy of the detected borders of a particular defect. Other light source configurations can also be used with still larger numbers of light sources.

It will also be appreciated that a single light source can also be used to provide illumination from multiple directions by relatively re-positioning scanner 16 elements (in FIG. 1) and/or by adding one or more sensors. Moving the single light source to a different position in such a way makes it virtually a second light source.

It will be also appreciated that where a different image-capturing device or device configuration than line scanner 16 is utilized, relative repositioning of the device elements might be conducted in a substantially different manner consistent with the device and/or application. For example, a particular image-capturing device might operate more effectively through movement of a single element or a different element grouping, such as platen 22 and/or a source medium (e.g., document 12). A given device might further utilize one light source or more than two light sources, as discussed above. A given application might further benefit from capturing a different image portion (e.g., pixel, grouping of pixels, lengthwise partial line, etc.), among other examples. Therefore, while reference might be made herein to "movement" of one or more specific system elements and/or in a particular manner, any such references includes any relative re-positioning of applicable elements whereby capturing is provided in a manner consistent with the teachings herein. Mechanisms for moving a document, platen, sensor, mirror or combination of elements in one or more directions, for example, are well known in the art of copiers, printers, scanners, facsimile machines and other devices.

It will be apparent to those skilled in the art that variations of data-processing system 18 (FIGS. 1 and 2) can be made, and that the embodiments mentioned herein are considered representative. For example, many elements, such as data-processing system 18 (and/or its component elements), can be implemented in software, hardware or a combination of both. Another example is that such processing-system alternatives as multiple systems, CPUs, dedicated microprocessors, and/or digital signal processors ("DSPs") among others, might be used. A further example is that sources of image data other than or in addition to an image-capturing system (e.g., stored images, transferred images and/or processed data) can be utilized. Communications interface 70 (as seen in FIG. 2) can still further comprise any number of wired and/or wireless connections to a local and/or wide area network, the Internet and/or other connectable devices and/or systems. Such connections enable a vast array of data transfer, sharing, workload distribution, downloadable code and/or data, and other capabilities, as are continuously being introduced, advanced and more widely adopted. Various input and output devices can also be used; however, output devices preferably include an image printer and at least one image viewing device, such as a CRT and/or flat panel display. Still further, various operating systems and data-processing systems can be utilized. In one embodiment, a conventional multitasking operating system such as Windows 95 or Windows NT running on a computer with a Pentium II processor, is presumed for the discussion herein.

Although the present invention has been described in detail with reference to the preferred embodiments thereof, those skilled in the art will appreciate that various other substitutions and modifications can be made to the examples described herein while remaining within the spirit and scope of the invention as defined in the appended claims.

What is claimed is:

1. An imaging system comprising:
    a first light source operable to illuminate an image plane in a first direction;
    a second light source operable to illuminate the image plane from a second direction;
    a third light source operable to illuminate the image plane;
    a sensing device operable to detect light from the first light source, the second light source, and the third light source that interacted with and impinges the image plane; and,
    a processor operable to receive information from the sensing device and determine an image and image defects.

2. The system of claim 1, wherein the first and second light source are fluorescent light sources.

3. The system of claim 1, wherein one of the light sources is an infrared light source.

4. The system of claim 1, wherein one of the light sources is an ultraviolet light source.

5. The system of claim 1, wherein the first light source is set at a predetermined angle between 30 and 70 degrees from an image plane and the second light source is set at a predetermined angle between 110 and 150 degrees from an image plane.

6. The system of claim 1, wherein the image plane comprises a document.

7. The system of claim 1, wherein the image plane comprises a platen in the imaging system.

8. The system of claim 1, further comprising a transport mechanism and a controller.

9. The system of claim 8, wherein the transport mechanism is operable to move the sensing device across the image plane.

10. The system of claim 1, wherein the second light source comprises a reflective surface operable to receive light from the first light source and reflect the light to illuminate the image plane.

11. The system of claim 10, further comprising shutters placed between the first light source and the image plane and the second light source and the image plane, the shutters operable to control the illumination of the image plane.

12. The system of claim 1, wherein the light sources are set at a predetermined angle of substantially 120 degrees from each other.

13. The system of claim 12, wherein the first light source, the second light source and the third light source are associated with a drum scanner.

14. The system of claim 1, further comprising a fourth light source, the scanning device operable to detect light from the third light source and fourth light source which have been influenced by the image plane.

15. The system of claim 14, wherein the light sources are spaced substantially 90 degrees from each other.

16. The system of claim 1, wherein the first light source and second light source comprise a first mirror and a second mirror operable to focus light from a common source.

17. The system of claim 1, wherein the sensing device is placed behind the image plane and the image plane is substantially transparent.

18. The system of claim 1, wherein the processor operates to correct the image based on the image defects.

19. A method for obtaining an image and defect data comprising:
   producing a first record image of a source document by illuminating a source document from a first direction, the illumination interacting with the source document;
   producing a second record image of the source document by illuminating the source document from a second direction, the illumination interacting with the source document;
   producing a third record image of the source document by illuminating the source document from a third direction; and
   using the first record image, the second record image, and the third record image to reproduce an image of the source document and a defect map.

20. The method of claim 19, herein the step of using the first record further comprises the steps of:
   detecting the illumination after interacting with the source document from the first direction and the second direction to form the first record and the second record; and
   processing the records to form the image and the defect map.

21. The method of claim 19, wherein the steps of producing a first record image and producing a second record image further comprises:
   using a first light source to illuminate the source document from the first direction; and
   using a second light source to illuminate the source document from the second direction.

22. The method of claim 21, wherein the steps of using a first light source and using a second light source comprises using a fluorescent light source as a first light source and using a fluorescent light source as a second light source.

23. The method of claim 21, wherein the steps of using a first light source and using a second light source comprises using an infrared light source for at least one of the light sources.

24. The method of claim 19, wherein the steps of using a first light source and using a second light source further comprises using an ultraviolet light source for least one of the light sources.

25. The method of claim 19, wherein the steps of using a first light source and using a first light source further comprises using an infrared light source for at least one of the light sources further comprises:
   setting the first light source at a predetermined angle between 30 and 70 degrees from an image plane; and
   setting the second light source at a predetermined angle between 110 and 150 degrees from an image plane.

26. The method of claim 19, wherein the steps of producing a first record image and producing a second record image further comprises moving a sensing device over the document.

27. The method of claim 19, wherein the steps of producing a first record image and producing a second record image further comprises:
   providing a first light source to illuminate the source document from a first direction; and
   providing a reflective surface operable to receive light from the first light source and reflect the light to illuminate the document from a second direction.

28. The method of claim 19, wherein the steps of producing a first record image and producing a second record image further comprises:
   using a common source of light to reflect light off a first mirror to illuminate the source document from a first direction; and
   using the common source of light to reflect light off a second mirror to illuminate the source document from a second direction.

29. The method of claim 19, further comprising:
   correcting the image using the defect map.

30. The method of claim 29, wherein a defect area is defined within the image; and
   the defect area is corrected by filling in the defect area with an average value obtained from the pixels surrounding but not including the defect area.

31. A method for obtaining an image and defect data comprising:
   producing a first record image of a source document by illuminating a source document from a first direction, the illumination interacting with the source document;
   producing a second record image of the source document by illuminating the source document from a second direction, the illumination interacting with the source document;
   using the first record image and the second record image to reproduce an image of the source document and a defect map; and
   correcting the image using the defect map, wherein the image is corrected by increasing an intensity of each image pixel by an amount proportional to the intensity of each defect pixel.

32. A scanner comprising:
   a first light source operable to illuminate an image plane in a first direction;

a second light source operable to illuminate the image plane in a second direction;

a sensing device operable to detect light reflected by the image plane and to detect light from the second light source reflected from the image plane;

a processor operable to identify defect information using the difference in intensity of matching pixels in the first image record and the second image record;

wherein illumination from the first light source and the second light source are applied at separate times; and a third light source operable to illuminate the image plane, the sensory device operable to detect light impinging the image plane from the first light source, the second light source and the third light source.

33. The scanner of claim 32, wherein the first and second light source are fluorescent light sources.

34. The scanner of claim 32, wherein one of the light sources is an ultraviolet light source.

35. The scanner of claim 32, wherein the first light source is set at a predetermined angle between 30 and 70 degrees from an image plane and the second light source is set at a predetermined angle between 110 and 150 degrees from the image plane.

36. The scanner of claim 32, further comprising a transport mechanism and a controller.

37. The scanner of claim 32, further comprising a transport mechanism operable to move the sensing device over the image plane.

38. The scanner of claim 32, wherein the second light source comprises a reflective surface operable to receive light from the first light source and reflect the light to illuminate the image plane.

39. The scanner of claim 32, wherein the light sources are set at a predetermined angle of substantially 120 degrees from each other.

40. The scanner of claim 32, wherein the first light source and second light source comprise a first mirror and a second mirror operable to focus light from a common source.

41. The scanner of claim 32, wherein the difference in intensity of matching pixels are used to form a defect map.

42. The scanner of claim 32, wherein the processor is also operable to correct the first image record using the defect information.

43. A scanner comprising:

a first light source operable to illuminate an image plane in a first direction;

a second light source operable to illuminate the image plane in a second direction;

a sensing device operable to detect light reflected by the image plane and to detect light from the second light source reflected from the image plane;

processor operable to identify defect information using the difference in intensity of matching pixels in the first image record and the second image record; and wherein illumination from the first light source and the second light source are applied at separate times and the processor is also operable to correct the first image record by increasing an intensity of each first image record pixel by an amount proportional to the intensity of each matching defect pixel.

44. A method for acquiring a digital representation of an image plane comprising:

illuminating the image plane using a first light source from a first direction;

illuminating the image plane using a second light source from a second direction;

detecting the light interacting with the image plane from the first light source;

detecting the light interacting with the image plane from the second light sources;

creating a first image record from the detected interaction of the first light source with the image plane;

creating a second image record from the detected interaction of the second light source with the image plane;

processing the records to form an image and a defect map; and correcting the image using the defect map, wherein the image is corrected by increasing an intensity of each pixel by an amount proportional to the intensity of each matching defect pixel.

45. The method of claim 44, wherein the steps of detecting the light interacting with the image plane comprises detecting light reflected from the image plane.

46. The method of claim 44, wherein the steps of detecting the light interacting with the image plane comprises, in part, detecting light transmitted through the image plane.

47. The method of claim 44, wherein a defect area is defined within the image; and the defect area is corrected by filling in the defect area with an average value obtained from the pixels surrounding, but not including, the defect area.

48. An imaging defect detection system comprising a first light source operable to illuminate an image plane from a first direction;

a second light source operable to illuminate an image plane from a second direction;

a sensing system operable to detect light from the first light source and second light source that interacted with the image plane;

a processor operable to receive information from the sensing system and form a first image record from the light interacting with the image plane from the first light source and form a second image record from the second light source; and, wherein defects are located by comparing the first data record and the second data record and the processor is also operable to correct the first image record by increasing an intensity of each first image record pixel by an amount proportional to the intensity of each matching defect pixel.

49. The system of claim 48, wherein the image plane comprises a document.

50. The system of claim 48, wherein the image plane comprises a platen.

51. The system of claim 48, wherein the processor is also operable to correct the first image record using the location of the defects.

52. An imaging defect detection system comprising:

a first light source operable to illuminate an image plane from a first direction;

a second light source operable to illuminate an image plane from a second direction;

a third light source operable to illuminate the image plane;

a sensing system operable to detect light from the first light source, the second light source and the third light source that interacted with and; impinges the image plane; and a processor operable to receive information from the sensing system and form a first image record from the light interacting with the image plane from the first light source, form a second image record from the second light source, and form a third image record from the third light source, wherein defects are located by comparing the first data record, the second data record, and the third data record.

53. A method for determining a defect record of an image plane comprising:

obtaining a first image record based on light influenced by the image plane from a first light source;

obtaining a second image record based on light influenced by the image plane from a second light source;

obtaining a maximum pixel intensity record by comparing the first and second image records and selecting the highest pixel intensity value for a given pixel location;

obtaining a minimum pixel intensity record by comparing the first and second image records and selecting the lowest pixel intensity value for a given pixel location;

obtaining a difference record by subtracting the minimum pixel intensity record from the maximum pixel intensity value;

locating the center of a defect region by locating localized minimums in the difference record; and determining defect boundaries based on the difference record.

54. The method of claim 53, further comprising:

determining upper and lower pixel intensity values from the difference record; and labeling pixels as defective based on the upper and lower thresholds and the defect boundaries.

55. The system of claim 53, wherein the image plane comprises a document.

56. The system of claim 53, wherein the image plane comprises a platen.

57. The method of claim 53, further comprising:

correcting the image using the defect boundaries and difference record.

58. The method of claim 57, wherein the defect region is corrected by increasing an intensity of each first image record pixel in the defect region by an amount proportional to the intensity of each matching defect pixel.

59. A method for locating image defects comprising:

locating shadow pixels in a first image record;

locating shadow pixels in a second image record;

comparing the shadow pixel regions to form defect boundaries;

forming a defect map based on the defect boundaries; and correcting the image using the defect map, wherein the first image record is corrected by increasing an intensity of each first image record pixel by an amount proportional to the intensity of each defect pixel.

* * * * *

UNITED STATES PATENT AND TRADEMARK OFFICE
CERTIFICATE OF CORRECTION

PATENT NO. : 6,498,867 B1
DATED : December 24, 2002
INVENTOR(S) : Potucek et al.

It is certified that error appears in the above-identified patent and that said Letters Patent is hereby corrected as shown below:

Column 13,
Line 51, change "herein" to -- wherein --.

Column 14,
Line 12, change "using a first light source further" to -- using a second light source further --.

Column 16,
Line 4, change "sources" to -- source --.
Line 27, change "comprising" to -- comprising: --.
Line 63, change "and; impinges" to -- and impinges --.

Signed and Sealed this

Twenty-fifth Day of March, 2003

JAMES E. ROGAN
*Director of the United States Patent and Trademark Office*